US009177173B2

(12) United States Patent
Boelter et al.

(10) Patent No.: US 9,177,173 B2
(45) Date of Patent: Nov. 3, 2015

(54) HANDLING REPEATED REQUESTS FOR THE SAME USER DATA

(71) Applicant: Intel Corporation, Santa Clara, CA (US)

(72) Inventors: Joshua Boelter, Portland, OR (US); Lily Kolle, Hillsboro, OR (US); Don G. Meyers, Rescue, CA (US); David Stanasolovich, Albuquerque, NM (US); Sudip S. Chahal, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 13/718,212

(22) Filed: Dec. 18, 2012

(65) Prior Publication Data

US 2014/0173752 A1      Jun. 19, 2014

(51) Int. Cl.
*G06F 7/04* (2006.01)
*G06F 17/30* (2006.01)
*H04N 7/16* (2011.01)
*G06F 21/62* (2013.01)
*G06F 21/33* (2013.01)

(52) U.S. Cl.
CPC .......... *G06F 21/6245* (2013.01); *G06F 21/335* (2013.01); *G06F 2221/2115* (2013.01)

(58) Field of Classification Search
CPC .............................. G06F 21/00; G06F 21/6245
USPC ........................................................... 726/28
See application file for complete search history.

(56) References Cited

U.S. PATENT DOCUMENTS

| | | | |
|---|---|---|---|
| 7,647,628 B2* | 1/2010 | Kebinger et al. | 726/17 |
| 7,716,337 B2* | 5/2010 | Yamakawa et al. | 709/227 |
| 8,271,549 B2* | 9/2012 | Klein et al. | 707/813 |
| 2009/0106816 A1* | 4/2009 | Ito | 726/1 |
| 2009/0307756 A1* | 12/2009 | Kang | 726/4 |
| 2009/0320098 A1* | 12/2009 | Roberts et al. | 726/3 |
| 2011/0307376 A1* | 12/2011 | Woxblom | 705/39 |
| 2012/0297308 A1* | 11/2012 | Anikul et al. | 715/738 |
| 2013/0041982 A1* | 2/2013 | Shi et al. | 709/217 |

* cited by examiner

*Primary Examiner* — Dant Shaifer Harriman
(74) *Attorney, Agent, or Firm* — Trop Pruner & Hu, P.C.

(57) ABSTRACT

In accordance with some embodiments, data may be automatically provided on preordained conditions for specific types of data. Thus specific types of data or specific requestors may be treated differently. The system may be programmed to respond appropriately to requests for certain types of data from certain types of requestors. This offloads the need to review specific requests in many cases and enables an automated system for providing requested data as appropriate.

23 Claims, 6 Drawing Sheets

HANDLING REPEATED REQUESTS FOR THE SAME USER DATA

BACKGROUND

This relates generally to computers or processor based systems and particularly to systems that handle automatic provision of repeatedly requested data.

Existing systems called auto complete systems use web browsers to automatically provide the user's name and address to prearranged or preordained fields. This saves the user the time and trouble of providing data.

BRIEF DESCRIPTION OF THE DRAWINGS

Some embodiments are described with respect to the following figures.

DETAILED DESCRIPTION

In accordance with some embodiments, data may be automatically provided on preordained conditions for specific types of data. Thus specific types of data or specific requestors may be treated differently. A system may be programmed to respond appropriately to requests for certain types of data from certain types of requestors. This offloads the need to review specific requests in many cases and enables an automated system for providing requested data as appropriate.

Figure 1:
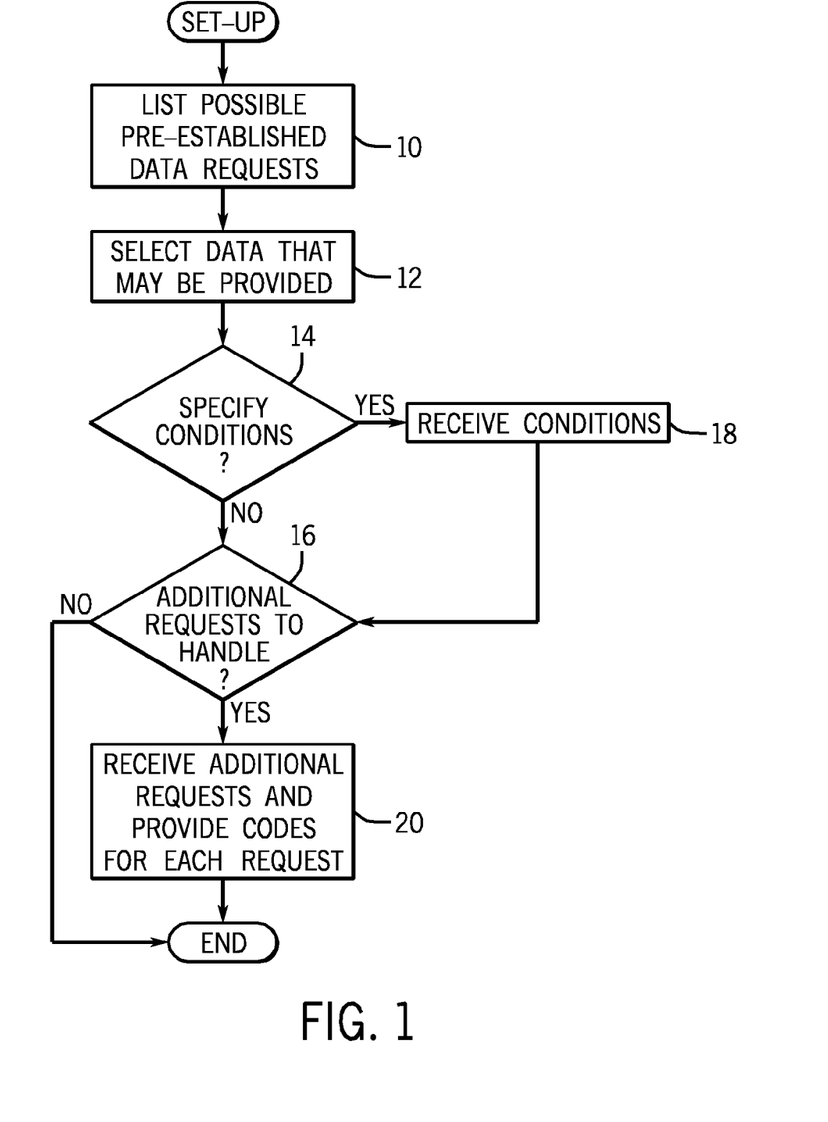
FIG. 1 is a flow chart for a set up sequence in accordance with one embodiment.

Referring to FIG. 1, set up sequence provides the inputs which the system needs to determine how to arbitrate requests for data. It can input the conditions for specific types of requests for specific kinds of data so that the system can self execute those requests in the future. In some cases, whether or not the data is provided is based on what the data is that is requested and who it is that is requesting the data.

Thus, in the set up sequence, initially a list of possible pre-established data requests may be created as indicated in block 10. This may include providing elaborate lists of data for the user to pick which ones the user wants to execute in a given application. It may also permit user definition of specific data requests.

Then at block 12 the system selects what data may be provided. In some cases, certain data may never be provided no matter who it is that is requesting the data.

Then in diamond 14 there is a check to determine whether conditions need to be specified. If so those conditions may be received as indicated in block 18. The conditions may be received by any suitable interface including a graphical user interface or an audible interface to give two examples. The conditions include conditions on what information can be provided under what circumstances and to whom.

For example, certain specific requested data may be provided to all comers. Certain other requested data may only be provided upon approval of the user. Still other examples may require that the requestor provide a code in order to be granted access to given information. This allows the user to prescreen who it is that can get certain types of information. For example, the user may authorize a doctor to get certain information that the user does not authorize the government to access.

Different classes of users may be authenticated as a group. For example, one may authorize his or her specific doctor and dentist to receive medical information. He or she may also authorize all clothing stores to receive style preferences. This may be implemented by a formal registry of requestors with requisite identifying or authentication information.

Specific types of requests, conditions for responding, and different conditions for different requestors may be stored in a database. The database may include tables that correlate specific requests to the conditions that are appropriate to the request based on the type of requestor. However any type of data organization may be used in other embodiments.

Then at diamond 16 it is determined whether there are any additional potential requests to handle (block 20). If not, the flow ends and otherwise additional requests may be provided together with conditions and/or codes for each request as desired.

The exchange of information between a requestor and the user may be initiated by the user upon showing an intent to provide data, for example by one of two general methods. The user may establish a connection from the user device to that of another party. One general method involves establishing a communication session by near-field communication (NFC), Bluetooth or network connections to mention some examples. The other general method is to directly interact with a third party data provider and to authorize the retrieval of information such that it "auto-completes" the form on a terminal with data previously stored with a third party.

Once the user has initiated a session, the requestor indicates the information that is requested. For example it might be some combination of name, address, email, health history, preferences, etc. The requests may be in a prearranged format and possibly may use a particular request template. That request is the basis of a prompt to the system to authorize a transfer of data. Various interfaces can be used wherein the user may choose to authorize all, some or none of the requested information. The user may also be offered the opportunity to preview or edit the information that actually is provided. In addition, the user may also choose to automatically provide certain information without the burden of requiring user interaction. Further, the user may choose to automatically provide information to certain trusted requestors.

Once the exchange of the specified information is authorized by the user, the data may be provided directly by the requestor's device or it may be provided by an external party such as one associated with the cloud. That external party may then handle data provisioning.

Figure 2:
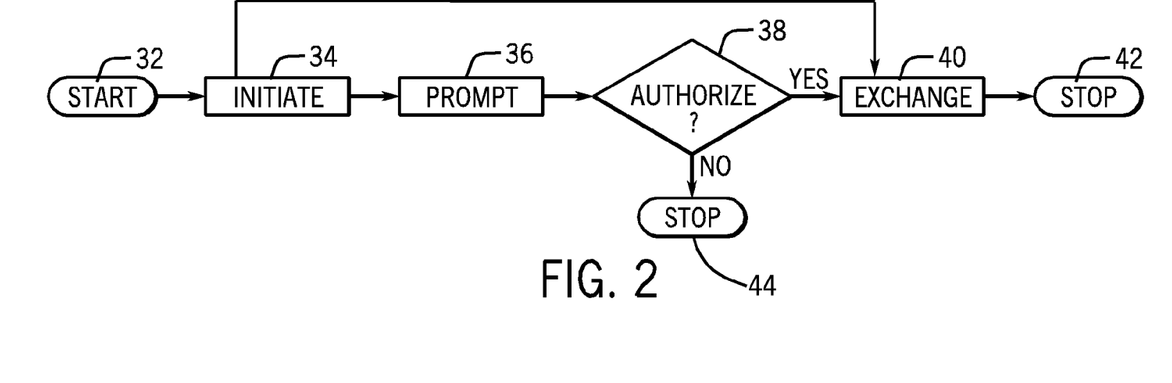
FIG. 2 is a flow chart for a sequence for selectively providing data in response to a request from an outside source.

Thus, referring to FIG. 2, the execution of a transferred data begins at 32. The exchange of information is initiated by the user at 34. A response from the requestor indicates the information that is requested. If the requested data is not pre-authorized, the requested data forms the basis of a prompt to interact with the user at 36 to authorize the transfer of data. Various interfaces can be imagined wherein the user may choose to authorize, all, some or none of the requested information. The user may also be offered the opportunity to preview and/or edit the information in the prompt. If the transfer is not authorized the process stops at 44. Otherwise the data is exchanged at block 40 and the flow stops at 42. In the case of pre-authorized exchanges, the flow may jump from initiate at 34 to exchange 40 as indicated by line 35.

Figure 3:
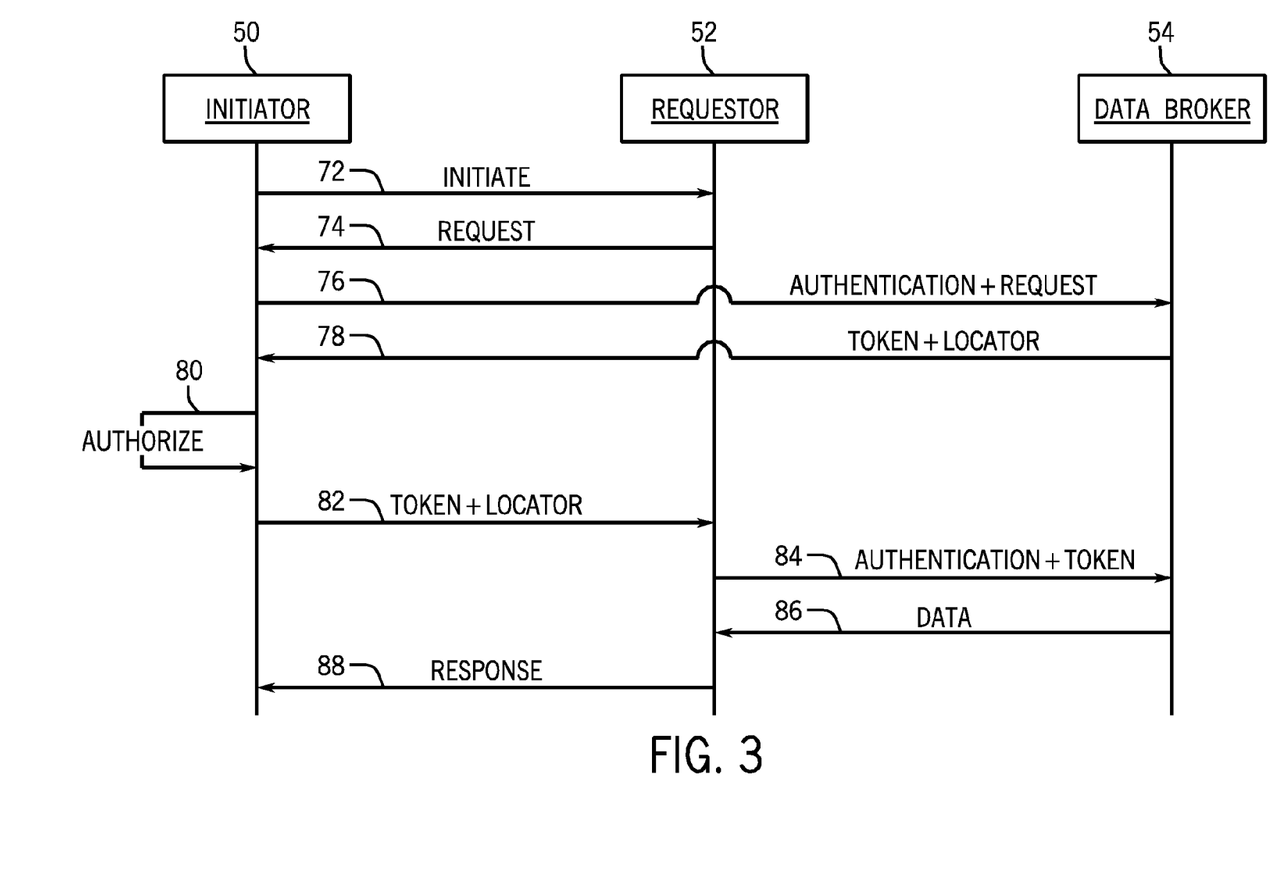
FIG. 3 is a diagram of a transaction between an initiator, a requestor and a data broker according to one embodiment.
Figure 4:
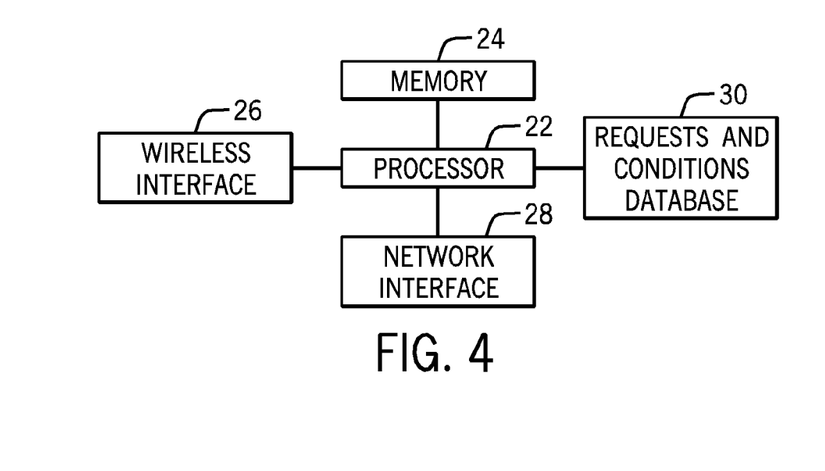
FIG. 4 is a system depiction for one embodiment.

Referring to FIG. 3, in accordance with another embodiment, a third party data broker 54 provides information pursuant to directions received in a token. In such an embodiment, instead of storing the conditions for transfer in the information provider (called the initiator 50), the conditions may be received by the data broker from the initiator as desired on a transaction by transaction basis for the benefit of a data requestor 52. Thus, as shown in FIG. 4, the initiator 50 is the component that initiates the data transaction, but the data is actually stored on a data broker 54. The information is provided to the requestor 52. As a simple example, the initiator may be a medical patient and a requestor may be an insurance company who wants medical information from a hospital that is a data broker. Thus, the information that is to be provided may be specified from the patient (i.e. initiator 50) to the hospital (i.e. data broker 54) for the benefit of a requestor 52 (that in this case is an insurance company).

As shown in FIG. 3, the initiator 50 may initiate (arrow 72) the transaction. In one embodiment this may be done by establishing a communication with a requestor 52. For example, the initiator 50 may tap a near-field communication (NFC) device to a second device so as to initiate a transaction with the second device held by a requestor 52. Once this happens, the requestor 52 initiates a request 74 which is processed by the initiator 50. The initiator 50 transforms the request from the requestor 52 into request (arrow 76) to the data broker. The request may be a data file with certain information in a certain format in one embodiment. The token specifies the data that is to be provided, the initiator whose data is to be provided, and the requestor who is authorized to receive the data. The initiator may also provide a log-in code to the data broker in order to authenticate the initiator, together with the request which specifies what data was to be provided and to whom it to should be provided.

The data broker 54 then returns (arrow 78) the token and the locator. The locator indicates where the information covered by the token is stored on the data broker 54 and basically provides an address for a subsequent request.

Then the initiator 50 may authorize (arrow 80) or not authorize the transaction once it examines the token and the locator. When the transaction is authorized, the token and the locator provided (arrow 82) to the requestor that then makes a direct request (arrow 84) using that information of the data broker. The data broker may provide the data (arrow 86) to the requestor who should provide a response (arrow 88) to the initiator to close the transaction.

Figure 5:
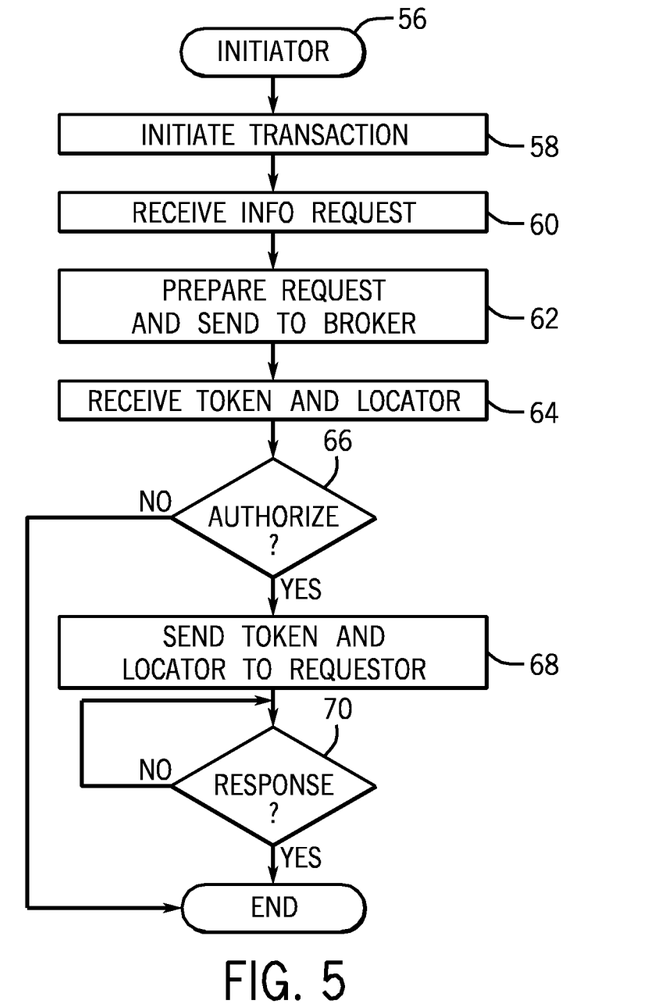
FIG. 5 is a flow chart for an initiator sequence according to one embodiment.

In accordance with some embodiments, the initiator sequence 56, shown in FIG. 5, begins by initiating a transaction as indicated in block 58. Then the initiator receives an information request from a requestor as indicated in block 60. In response, the initiator prepares a request and sends the request to the broker as indicated to block 62.

Next the initiator receives the token and locator from the broker as indicated in block 64. If the initiator chooses to authorize a transaction as determined in diamond 66, the initiator sends the token and the locator to the requestor 68. Ultimately the initiator receives response 70 which ends the transaction.

In some embodiments, the sequences shown in FIGS. 1, 2 and 5 may be implemented in hardware, software and/or firmware. In software and firmware embodiments it may be implemented by computer executed instructions stored in one or more computer readable media. Embodiments may be implemented in non-transitory computer readable storage media. Examples of computer readable media that are non-transitory include, but are not limited to magnetic, semiconductor and optical storage devices.

A system may be implemented by fixed or mobile computer systems including cellular telephones, laptop computers, mobile Internet devices, tablet computers, any personal computer, cameras or any other device, as shown in FIG. 4. The system may include a processor 22 communicatively coupled to a memory 24. The processor 22 may also be communicatively coupled to a database 30 that stores the request and conditions defined during the setup stage. A network interface 28 may be provided in order to enable communications over a network to obtain additional information or communicate with requestors. A wireless interface 26 may enable communication with requestors as well, for example over a short range wireless protocols. In other cases, longer range protocols such as cellular telephone protocols may be used. Another embodiment may involve two-system interaction (requestor/provider with a communication channel between them).

Figure 6:
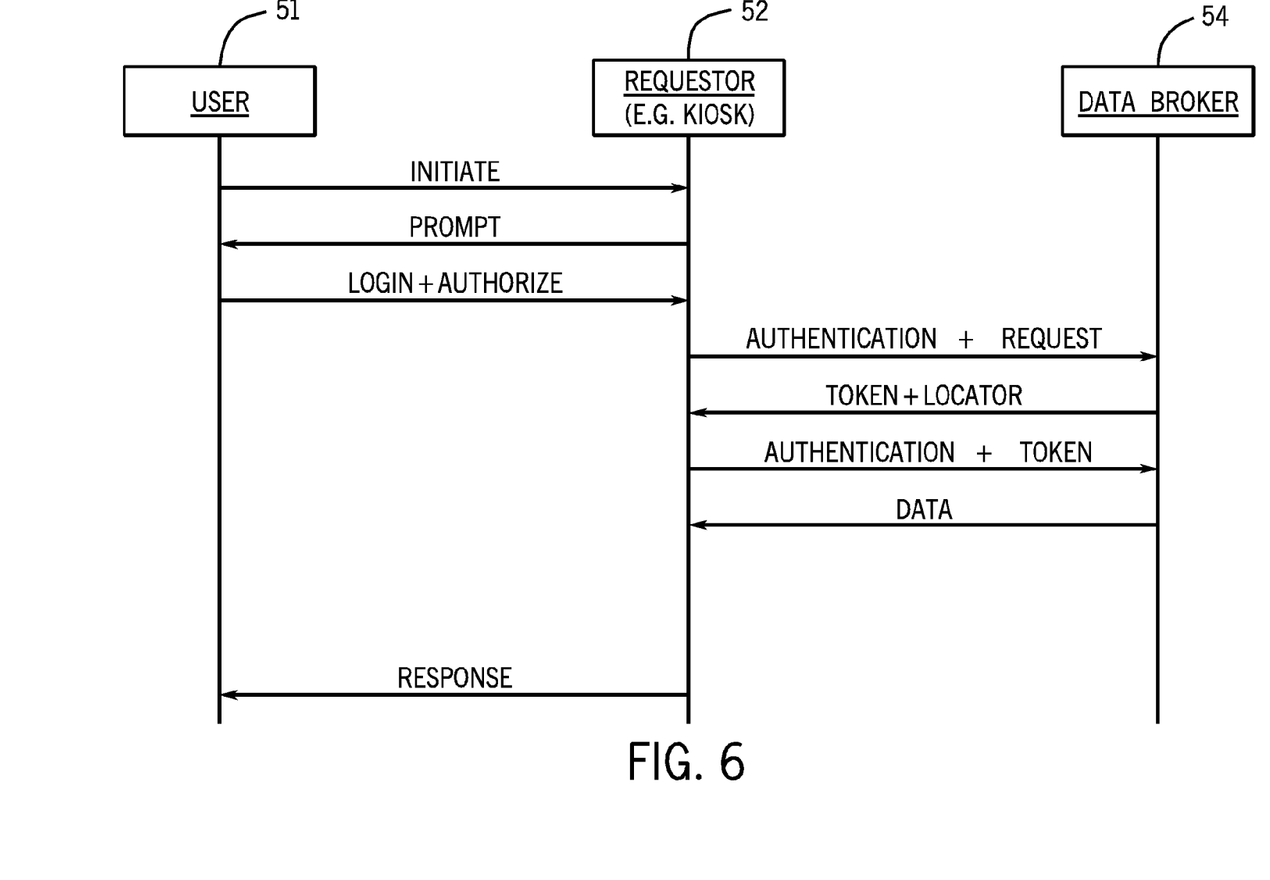
FIG. 6 is a diagram of a transaction involving a single device according to one embodiment.

Finally, another embodiment may use a kiosk or tablet model where only one device is present and communicates via the kiosk or tablet with a data broker in the cloud, as shown in FIG. 6. The user initiates a transaction (prompt, log-in, authenticate) with a requestor that may be a kiosk in one embodiment. The requestor 52 authenticates the user 51 to the data broker 54, and gets a token and a locator from the requestor. The requestor then authenticates with the data broker 54 and provides the token to retrieve the required data. Then the requestor responds to the user. Skilled practitioners may optimize this sequence to reduce the number of interactions between the requestor and data broker.

Among the conditions that may be enforced may be a time of day condition, a duration condition, a requirement for a password or code, an identification of the requestor, an identification of the specific information requested, an agreement of confidentiality, an agreement not to transfer the information to other users, a certification by a certifying authority that the requestor is a legitimate entity, or any other authentication requirements.

Establishment of a session between a request for a provider may be initiated by the provider of information. For example, the provider may initiate a communication event, such as a Near Field Communication, in order to push information to a potential requester. For example, this may occur in connection with the provision of data to a third party that then handles actually provisioning the data to a requester or potential requester. On the other hand, the communication session may be initiated by the requester as well.

In some cases, it may be desirable to identify and/or authenticate the requester. It may also be advantageous to identify and/or authenticate the provider. In some cases, the requester may need some assurance that the data it is receiving is authentic and, thus, two-way authentication or identification may be desirable in some cases. The identification or authentication may authenticate either the requester or the provider as an individual or as a member of a group or class.

In some cases, the provider may specify the exact information that it receives and, in other cases, it may get a standard template of information. The release of information or the transfer of information may be implemented manually, in some embodiments, to allow, for example, the provider of information, to control exactly what information is provided. In other cases, the transfer may be done automatically. For example, the automatic transfer may be based solely on the identity of the requester or the authentication of the requester. It may also be based on other criteria, including a specification of proper forms of data, the time of day, the provision of a code, or in some other cases.

Then, of course, the requester can receive the information directly from the provider, for example, via a device-to-device transfer or indirectly through a broker or data provider that is a third party to the transaction. For example, such data transfers may be implemented by a cloud provider.

Examples of requesters may be doctor's offices, kiosks in a mall, a ticket machine in the airport, or anyone else who may need information about a data provider, for example, to initiate a transaction, to provide a service, or for any other reason. The provider may be a user that may be a device such as a cellular telephone. It may also be a third party that stores data on behalf of users for provision under specific conditions. For example, a cloud provider may provide this service in some embodiments.

The interaction between the requester and the provider may be between two devices, for example, where the provider has a cellular telephone and the requester is a kiosk. The interaction may also occur on one device where the requester is a kiosk and the provider authorizes the transfer of information from a third party source.

Figure 7:
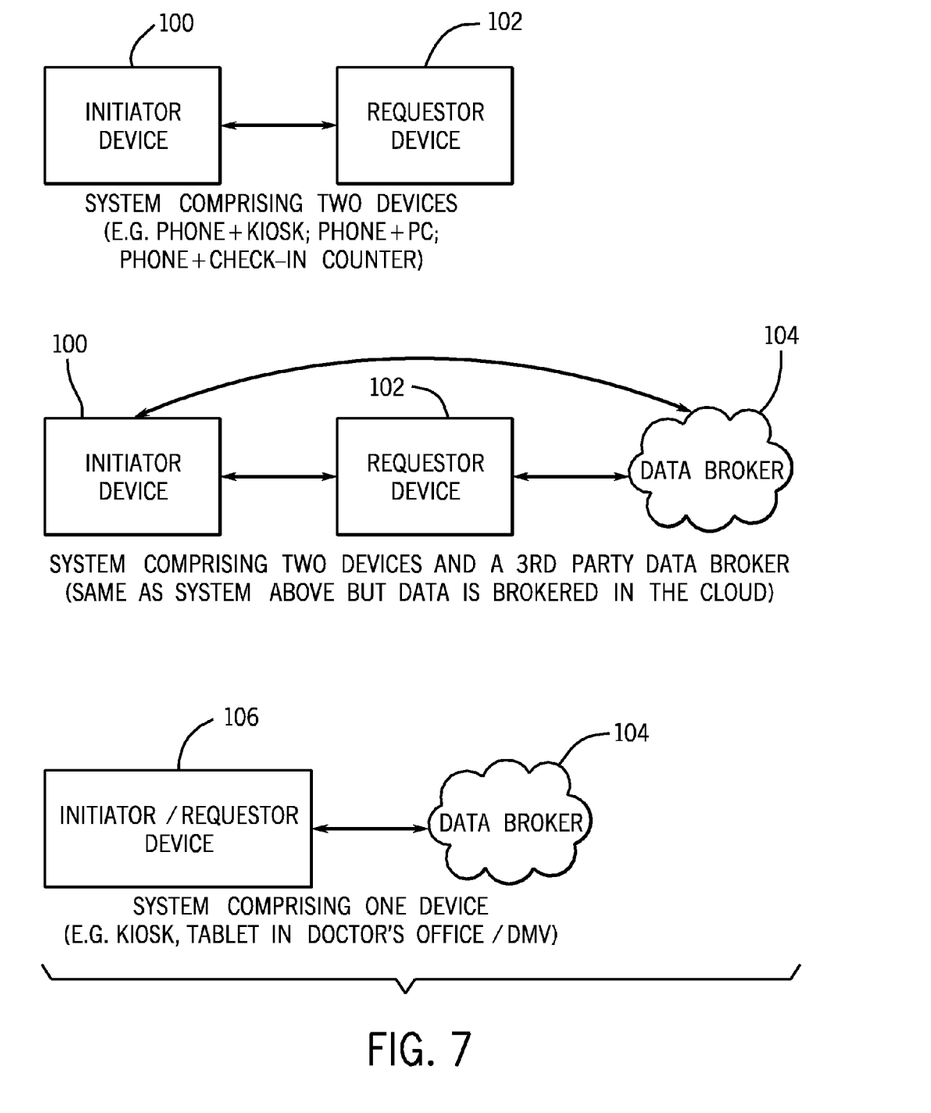
FIG. 7 is a depiction of system configurations for various embodiments.

There may be many different types of system implementations. The type of system (shown at the top of FIG. 7) comprises two devices 100, 102 such as a phone and a kiosk, a phone and a computer, or a phone and a check-in counter, as examples. Another type of system, shown in the middle of FIG. 7, comprises two devices 100, 102 and a third party broker 104. For example, data may be brokered in the cloud. A third type of system, shown at the bottom of FIG. 7, includes only one device 106 such as a kiosk or table in a doctor's office or a department of motor vehicles, as examples.

Additional Notes and Examples:

One example can include one or more non-transitory computer readable media may store instructions executed by a processor to establish a session with an electronic data requestor, automatically analyze the type of data requested in a computer consult a database to determine any conditions on the transfer of that type of data, and then provide the data pursuant to those conditions. The media may store instructions to obtain the requester's identity automatically as a condition to the transfer. The media may further store instructions to obtain the requester's identity automatically as a condition to the transfer. The media may further store instructions to obtain a code from the requester in order to authorize the data transfer and to specify what information may be transferred. The media may further store instructions to classify data requests from a requester based on the data requester's identity. The media may further store instructions to determine the type of data requested and to handle requests for different types of data differently. The media may further store instructions to authenticate the requester before providing the data. The media may further store instructions to authenticate a class of requesters to access data. The media may further store instructions to register requesters and their access rights to data. The media may further store instructions to automatically provide data to a third party to provide the data to the requester.

Another example can include a method for handling requests for data comprising, establishing a session with an electronic data requestor, automatically analyzing the type of data requested in a computer, consulting a database to determine any conditions on the transfer of that type of data, and then providing the data pursuant to those conditions. The method may also include obtaining the requester's identity. The method may also include obtaining a code from the requestor in order to authorize a data transfer. The method may also include classifying data requests based on the data requestor's identity. The method may also include handling requests for different types of information differently. The method may also include authenticating the requester. The method may also include authenticating a class of requesters to access data. The method may also include registering requestors and their access rights to data. The method may also include automatically providing data to a third party to provide the data to the requester.

Another example may include a data broker comprising a processor to receive a request for data by a requester, determine whether preprogrammed conditions are met, and, based on said determination, determine whether to provide specific data to said requester, wherein the data corresponds to an initiator, and wherein the conditions have been set by the initiator, and a storage coupled to said processor configured to store the requests for data. The data broker may include said processor to automatically obtain the requester's identity as a condition to transfer. The data broker may include said processor to obtain code from the requester in order to authorize the data transfer and to specify what information may be transferred. The data broker may include said processor to classify data requests from a requester based on the data requester's identity. The data broker may include said processor to determine the type of data requested and to handle requests for different types of data differently.

Another example may include one or more non-transitory computer readable media storing instructions executed by a processor to perform a sequence comprising enabling an initiator to initiate a transfer of specific data from a data broker to a data requestor by sending a token which specifies the initiator, the requestor and the information that is to be provided to a data broker, and enabling the data broker to provide the token and an address to the initiator for forwarding to the requestor.

The media may include instructions to perform a sequence including enabling the initiator to initiate the transaction with the requestor to cause data to be provided from the data broker to the requestor. The media may also include instructions to perform a sequence including enabling the initiator who has already initiated the transaction to authorize or not authorize the transaction after receiving a token and a locator that identifies the location of the data is to be provided from a data broker. The media may also include instructions to perform a sequence including authorizing the transaction by sending a token and the locator to the requestor. The media may also include instructions to perform a sequence including using said token to enable data to be distributed from a data broker in the form of a cloud.

References throughout this specification to "one embodiment" or "an embodiment" mean that a particular feature, structure, or characteristic described in connection with the embodiment is included in at least one implementation encompassed within the disclosure herein. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While embodiments have been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. One or more non-transitory computer readable storage media storing instructions executed by a processor to:
   establish a session with an electronic content requester;
   receive a request for content from a requester;
   identify from a plurality of requester types, a type of the requester;
   automatically analyze in a computer which type of subject matter among a plurality of types of subject matter is being requested by said request, the subject matter type based on the substance of the information expressed in the content;
   consult a database to determine any conditions on the transfer of that type of content for the requester's identified type; and
   then provide the content pursuant to those conditions or responsive to user interaction.

2. The media of claim 1, further storing instructions to obtain the requester's identity automatically as a condition to the transfer.

3. The media of claim 1, further storing instructions to obtain a code from the requester in order to authorize the content transfer and to specify what information may be transferred.

4. The media of claim 1, further storing instructions to classify content requests from a requester based on the content requester's identity.

5. The media of claim 1, further storing instructions to determine the type of content requested and to handle requests for different types of content differently.

6. The media of claim 1, further storing instructions to authenticate the requester before providing the content.

7. The media of claim 1, further storing instructions to authenticate a class of requesters to access content.

8. The media of claim 1, further storing instructions to register requesters and their access rights to content.

9. The media of claim 1, further storing instructions to automatically provide content to a third party to provide the content to the requester.

10. A method for handling requests for content comprising:
    establishing a session with an electronic content requester;
    receiving a request for content from a requester;
    identifying from a plurality of requester types, a type of the requester;
    automatically analyzing in a computer which type of subject matter among a plurality of types of subject matter is being requested by said request, the subject matter type being based on the substance of the information expressed in the content;
    consulting a database to determine any conditions on the transfer of that type of content for the requester's identified type; and
    then providing the content pursuant to those conditions or responsive to user interaction.

11. The method of claim 10, including obtaining the requester's identity.

12. The method of claim 10, including obtaining a code from the requester in order to authorize a content transfer.

13. The method of claim 10, including classifying content requests based on the content requester's identity.

14. The method of claim 10, including handling requests for different types of information differently.

15. The method of claim 10, including authenticating the requester.

16. The method of claim 10, including authenticating a class of requesters to access content.

17. The method of claim 10, including registering requesters and their access rights to content.

18. The method of claim 10, including automatically providing content to a third party to provide the content to the requester.

19. A data broker, comprising:
    a hardware processor to receive a request for content by a requester, identify from a plurality of requester types, a type of the requester; automatically analyze which type of subject matter among a plurality of types of subject matter is being requested by said request, the subject matter type being based on the substance of the information expressed in the content, consult a database to determine any conditions on the transfer of that type of content for the requester's identified type, and then provide the content pursuant to those conditions or responsive to user interaction, determine whether preprogrammed conditions are met, and, based on said determination, determine whether to provide specific content to said requester, wherein the content corresponds to an initiator, and wherein the conditions have been set by the initiator; and
    a storage coupled to said processor configured to store the requests for content.

20. The data broker of claim 19, said processor to automatically obtain the requester's identity as a condition to transfer.

21. The data broker of claim 19, said processor to obtain code from the requester in order to authorize the content transfer and to specify what information may be transferred.

22. The data broker of claim 19, said processor to classify content requests from a requester based on the content requester's identity.

23. The data broker of claim 19, said processor to determine the type of content requested and to handle requests for different types of content differently.

* * * * *